United States Patent [19]

Mims et al.

[11] Patent Number: 5,170,847
[45] Date of Patent: Dec. 15, 1992

[54] HYDRAULIC RELEASE OIL TOOL

[75] Inventors: Michael G. Mims, Bakersfield; Mark D. Mueller, Santa Maria, both of Calif.

[73] Assignee: Union Oil Company of California, Los Angeles, Calif.

[21] Appl. No.: 676,266

[22] Filed: Mar. 26, 1991

Related U.S. Application Data

[63] Continuation-in-part of Ser. No. 418,510, Oct. 10, 1989, Pat. No. 5,086,844, and a continuation-in-part of Ser. No. 589,321, Sep. 27, 1990, Pat. No. 5,086,843.

[51] Int. Cl.⁵ .............................................. E21B 17/02
[52] U.S. Cl. .................................. 166/383; 166/242; 285/306
[58] Field of Search ............... 166/212, 214, 242, 153, 166/154, 155, 156, 168, 285, 374, 381, 383, 117, 123, 125, 377; 175/61, 62; 285/83, 102, 306

[56] References Cited

U.S. PATENT DOCUMENTS

| | | |
|---|---|---|
| 2,422,236 | 6/1947 | Church . |
| 2,500,276 | 3/1950 | Church . |
| 3,037,797 | 6/1962 | Brown .................... 285/82 |
| 3,088,521 | 5/1963 | Graves ................... 166/214 |
| 4,064,953 | 12/1977 | Collins ................ 175/294 X |
| 4,239,083 | 12/1980 | Silberman et al. ......... 166/117.7 |
| 4,497,371 | 2/1985 | Lindsey, Jr. ............ 166/377 |
| 4,522,259 | 6/1985 | Akkerman ............... 166/237 |
| 4,526,233 | 9/1985 | Stout .................... 166/383 |
| 4,545,434 | 10/1985 | Higgins ................. 166/217 |
| 4,611,662 | 9/1986 | Harrington ............ 175/320 X |
| 4,796,698 | 1/1989 | Gano .................... 166/135 |
| 4,811,784 | 3/1989 | Theiss .................. 166/208 |
| 4,856,591 | 8/1989 | Donovan et al. ........ 166/380 X |

FOREIGN PATENT DOCUMENTS 0908564  8/1972  Canada ................................ 166/156

Primary Examiner—Terry Lee Melius
Attorney, Agent, or Firm—Gregory F. Wirzbicki; William O. Jacobson

[57] ABSTRACT

A hydraulic setting and release tool has a shear out setting assembly attached to a string coupling member. Upon reaching a predetermined hydraulic pressure, a piston of the tool shears restraining shear pins and moves in a body of the tool to release dogs that engage the coupling member. When used in running in a liner, the coupling member is a running head that rotates the liner during running in and cementing. When used as a drill string release tool, the coupling member is a release sub, the tool being placed serially with other string components. If the drill string gets stuck, it is separated by merely increasing the hydraulic pressure sufficiently to shear the pins and allow the piston to move and the dogs to retract to separate the release sub from the shear out assembly.

16 Claims, 2 Drawing Sheets

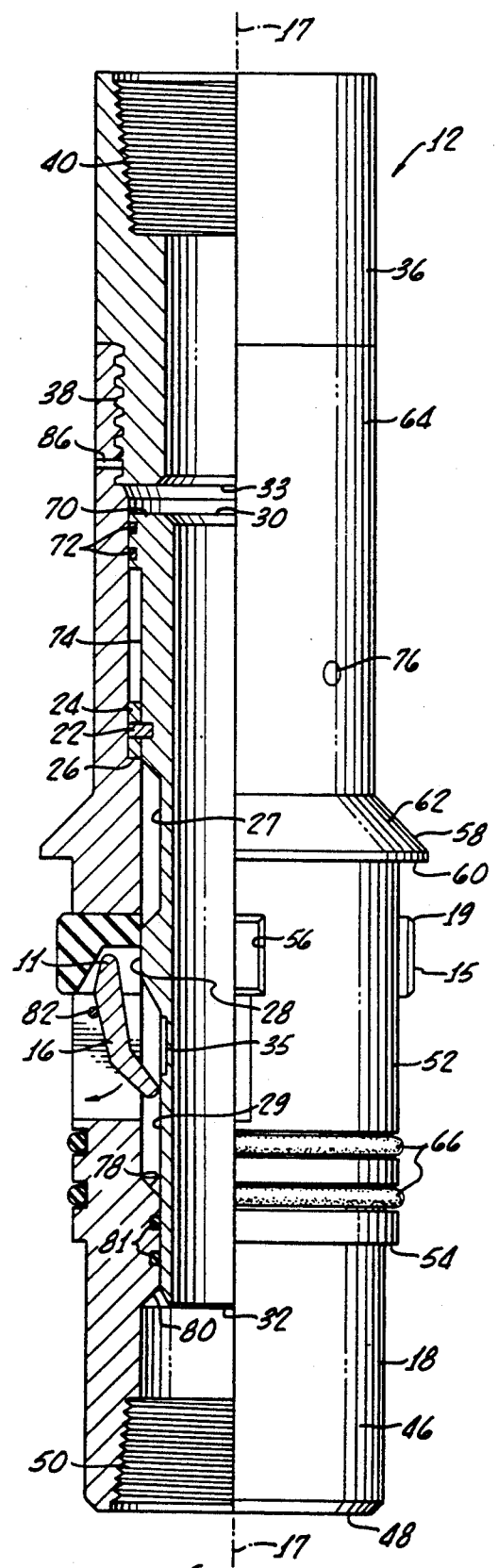
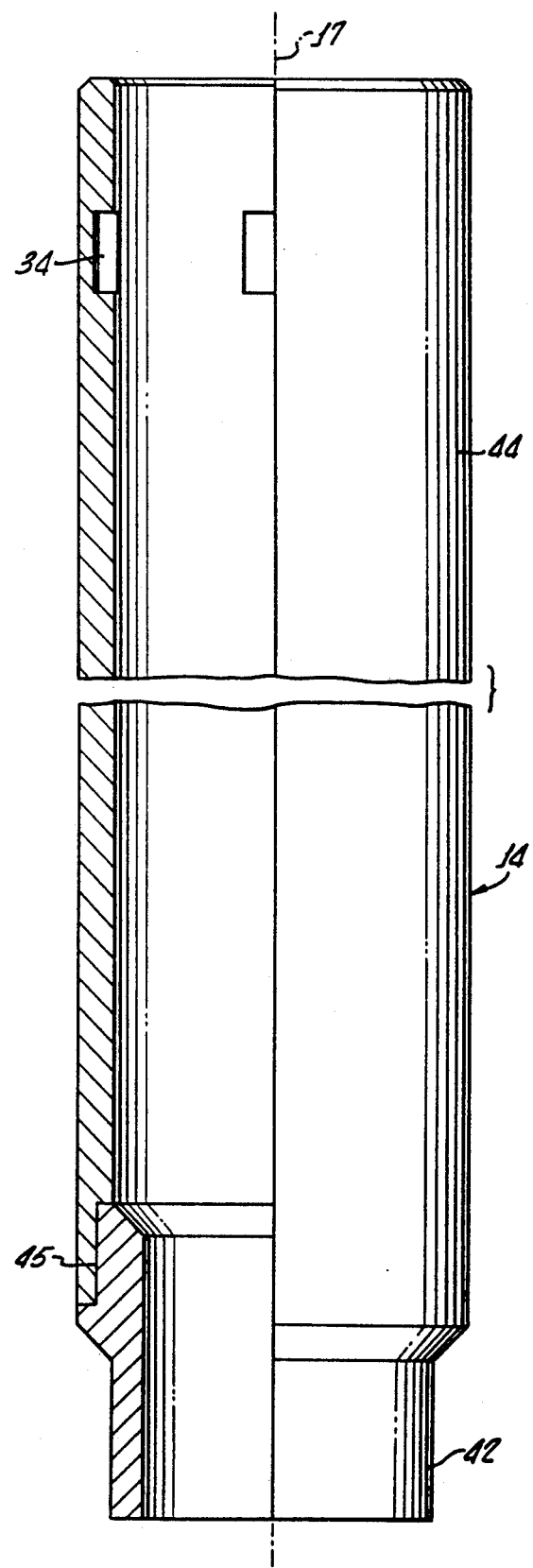
FIG. 1a.
FIG. 1b.

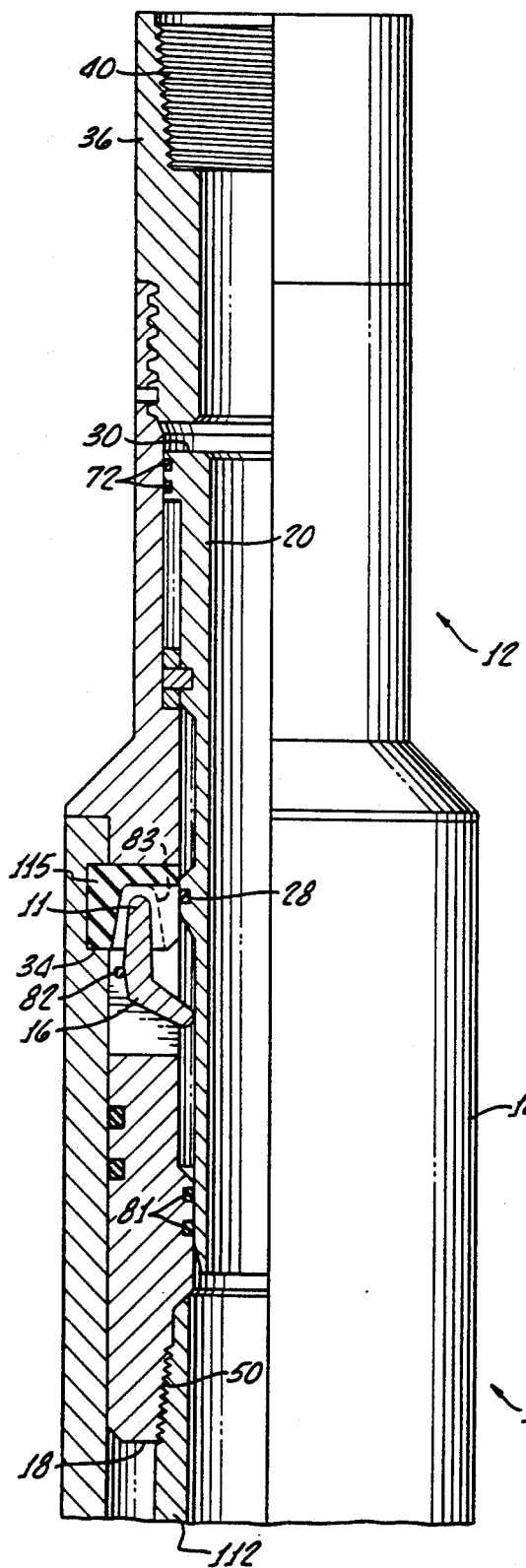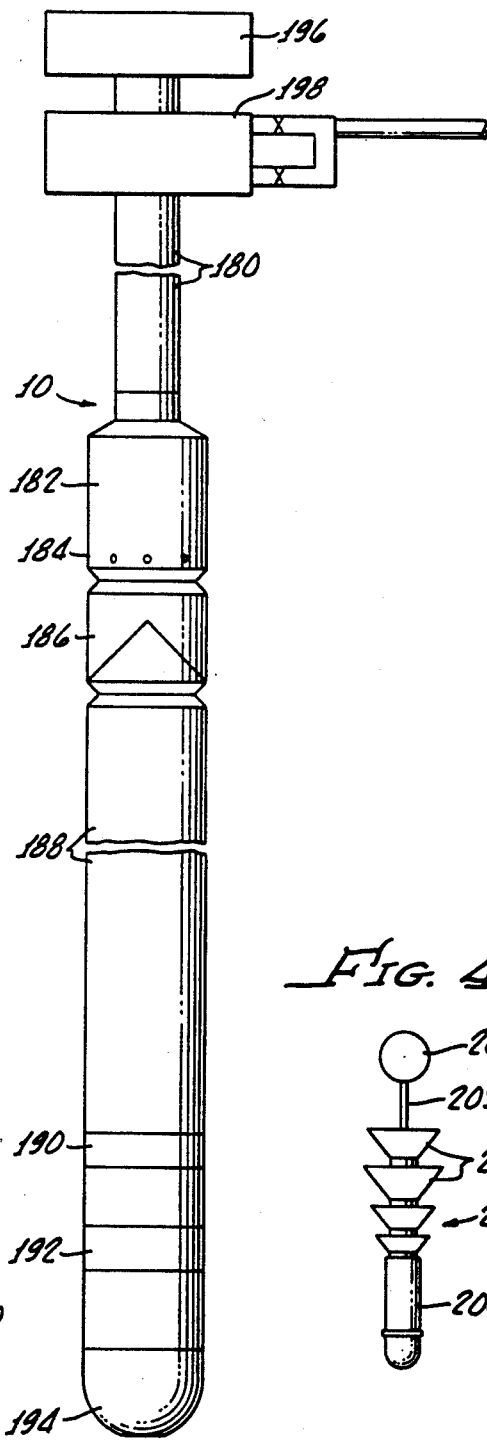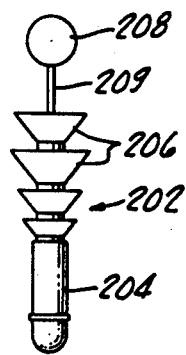

5,170,847

HYDRAULIC RELEASE OIL TOOL

CLAIM FOR PRIORITY

This application is a continuation-in part of copending application Ser. Nos. 07/418,510, filed Oct. 10, 1989, now U.S. Pat. No. 5,086,844, and 07/589,321, filed on Sep. 27, 1990, now U.S. Pat. No. 5,086,843. These applications are incorporated in their entirety herein by reference.

BACKGROUND OF THE INVENTION

The present invention relates to tools used in the drilling and completion of oil wells. In particular, the invention relates to a tool that can be used to reduce friction between a liner and a well bore during run in or to release a drill string prior to its removal from a well bore.

In the drilling of oil wells, a drill string and attached drill bit are used in conjunction with a flow of drilling mud to drill a well hole. After the well hole is drilled, the drill bit and drill string is removed and a casing or a liner may be run in (removably attached to a drill string) across the productive interval. With the casing or liner in place, cement slurry is pumped down through the drill pipe, through the liner or casing and into an annulus between the liner or casing and the well hole wall to set, cementing the liner or casing in place and keeping production fluids in the liner or casing.

Quite often, wells are not completely vertical. They can have substantial horizontal components. Wells with long portions having a substantial horizontal component are called high angle, extended reach wells. Running the liner through high angle, extended reach well holes can be difficult because of friction between the liner and the well hole wall caused by the weight of the liner against a nearly horizontal wall. Translational friction can be substantially reduced if the liner can be rotated while fluid is flowing and it is being run into the well hole.

Conventional tools to run liners into extended reach well holes have not been able to rotate the liners while they were being run in, although some tools permit rotation after run in and during cementing. However, these rotation permitting tools do not allow fluid (e.g., drilling muds or cement slurry) flow past the tool. Another reason for this lack of run in rotation is that one direction of rotation is conventionally used to release the run in tool from the liner once the liner is in place. Rotating may therefore cause the conventional connections to release. Consequently, it has not been generally possible to rotate the liner in either direction to reduce frictional drag during run in.

Sometimes during the drilling of a well, a drill string has to be pulled from the well hole because something in the leading end of the string gets stuck. To pull the main string portion may require disconnecting it from the stuck portion. Typical, the disconnection is done by applying left hand torque to the drill string in order to unscrew a connection at some arbitrary point within the drill pipe, if connection is not over-torqued. Thus, left hand rotation and excessive right hand torque is avoided during drilling.

SUMMARY OF THE INVENTION

The present invention provides a tool and a method for its use that runs a liner in a well hole while flowing (lubricating) fluid and rotating it under high torque conditions. It also permits the release of the tool from the liner and the pulling of the tool and drill pipe from the hole by simple hydraulic pressure after the liner is in place. The same tool also permits rotation and reciprocation of the liner during cementing. The present invention also provides a tool that can be used in a drill string to uncouple the string from its leading end at a selected location quite simply through hydraulic pressure when the leading end gets stuck to permit fishing and removal of the stuck end.

In one form, the present invention provides a hydraulic release tool that has a setting assembly and a coupling member. The setting assembly includes a body that contains a piston having a fluid passageway and dissimilar upstream and downstream areas exposed to fluid pressure. The unbalanced piston in a setting position is attached to the body, preferably through shear pins, so that it does not move with respect to the body until it sees a work string pressure that produces a force above a value sufficient to release the piston; when shear pins are used, to shear the pins. When this pressure is reached, the piston moves in the body to a release position. Dogs are slidably mounted in the body for radial movement between a retracted and an extended position. The dog's extended position corresponds to the piston's setting position and the dog's retracted position corresponds to the piston's release position. Piston lands and recesses are used to rotate a rocker arm when the piston moves from the setting to release positions. The rotation of the rocker is coupled to the retraction of the dogs from their extended to retracted position by a pinned connection. When the piston is in its setting position, a support land also blocks motion of the dogs from their extended position. The dogs in their extended position engage the coupling member through sockets so that the coupling member is rotationally and translationally attached to the setting assembly.

Means on the piston, such as a relief near the support land, and a rocker arm actuated by moving lands on the piston actuate and permit the dogs to inwardly retract when the piston moves to its release position. When the dogs retract, the coupling member and the setting assembly are no longer attached and can be separated. Preferably, the piston masks a relief port between work string pressure and ambient well pressure. When the piston moves to its release position, the port communicates the work string pressure to ambient pressure, lowering the work string pressure. This signals the disengagement between the setting assembly and the coupling member.

In another form, the present invention provides a hydraulic release tool that has a shear out setting assembly and running head as the setting assembly and the coupling member. The shear out assembly includes a body that receives a piston. The piston couples to the body through shear pins. The top (in the sense of drill string location) of the piston has a face that sees fluid (hydraulic) pressure within the drill pipe. The bottom of the piston also has a lower face, but it is smaller in area than the top face. Accordingly, increasing hydraulic pressure tends to move the piston towards the bottom of the string, but the piston is prevented from moving because of the shear pins. Dogs mount to the body and extend radially outward from it into engagement with sockets in the running head. This engagement rotationally and translationally couples the shear out assembly and the running head together. A rocker arm is actuated by a support land on the sheared out piston, which moves the dogs inward. The support land of the piston also engages the base ends of the dogs to keep them extended and in engagement in the sockets when the piston is in the engaged position in addition to any rocker arm positioning forces.

The hydraulic release tool can directly couple to a liner and rotate the liner so that it can overcome frictional resistance between it and the well hole wall in high angle, extended reach holes. The hydraulic release tool also allows rotating and reciprocation of the liner during cementing operations.

When it is time to pull and remove the drill pipe, hydraulic pressure in the pipe is increased sufficiently to shear the shear pins, releasing the piston. As the piston moves, the rocker arms act on the dogs to bias them inward towards the axis of the body and the shear out assembly. This can happen after a liner wiper plug has been forced through the liner to wipe cement off the walls of the liner. The wiper plug lands on a landing collar blocking flow and allowing the pressure (for example, from a positive displacement pump) to increase sufficiently to shear the pins. When the pins shear, the piston moves within the body to clear the support land from the base of the dogs. When the dogs become free of the setting land, the setting land contacts the rocker arm and withdraws the dogs from the sockets, releasing the shear out assembly from the running head. A chamfer on the outer face of the dogs also insures their release from the sockets; axial force applied to the dogs by the running head through the chamfered surfaces also produces radial retracting forces on the dogs after a small retraction.

Sometimes, the flow cannot be reduced and/or pressure in the work string cannot be increased enough to shift the piston and release the dogs. For example, if the wiper dart does not land on the landing collar, work string pressure may not be able to be raised sufficiently. When this happens, a pump down dart with a plug is pumped down the work string and lands on the piston of the hydraulic release tool, sealing the work string at this point (assuming the dart is sized to match the piston bore and no top assembly having a similar or smaller bore is used). With a seal at the piston, the flow stops and downstream pressure decreases to shear the pins. This allows a lower pressure than otherwise required because no area of the piston is exposed to the pressure acting the other way to oppose shearing force. Further, the bore through the piston has been closed to flow by the seal, and work string pressure on the full (annular plus sealing) area now increases the force on the piston that tends to shear the pins.

The hydraulic release tool can also be a drill string release tool. The release tool is modified from the liner release tool only to adapt it for placement in the drill string through a drill string release sub.

In use, the drill string release adaptation works much like its liner release counterpart. Hydraulic pressure is increased sufficiently to shear the pins that constrained the piston, and the piston moves to clear a support land from the base of dogs that engage sockets in a release sub. The release sub corresponds to the running head. Rocker arms act on the dogs to retract them from the sockets, and the drill string is separated from its stuck portion. The separated portion of the drill string can then be pulled from the hole and the troublesome leading end of the string removed from the hole through standard techniques, as through jars and fishing.

These and other features, aspects and advantages of the present invention will become more apparent from the following description, appended claims and drawings.

BRIEF DESCRIPTION OF THE DRAWINGS

FIGS. 1a and 1b show a separated, half-section view of a hydraulic release tool, especially suitable for liner run-in, cementing, and release;

FIG. 2 shows an assembled view of the hydraulic release tool of FIG. 1, again, partly in half-section;

FIG. 3 illustrates schematically the use of the tool of the present invention; and FIG. 4 shows a pump down dart that may be used with the present invention to increase the pressure on the piston to move it and release the release tool in the event that conventional techniques do not work.

In these Figures, it is to be understood that like reference numerals refer to like elements or features.

DESCRIPTION OF THE PREFERRED EMBODIMENT

With reference to FIG. 1, a hydraulic release tool 10 of the invention used to run in and cement liners. In use, the tool attaches serially in a work string between a drill pipe and the liner. The tool has a shear out setting assembly 12 and a coupling member in the form of a running head tie back receptacle 14. The shear out setting assembly and the running head have clear—through axial bores for flowing working fluids used in drilling and completing a well.

The shear out setting assembly has four radially extended dogs 15 that attach the shear out assembly to the running head when extended and release the two when retracted. A rocker arm 16 for each of these dogs can urge or force its dog inward toward a longitudinal axis 17 of the assembly, out of the extended position shown in FIG. 1. When the dogs are moved from the extended position, the running head is released. Each dog has a lead chamfer 19 which can be used to transform a portion of the axial forces to radial forces on the dog, if necessary.

Shear out setting assembly 12 includes a body 18 and a release piston 20 within the body. The piston can translate along a longitudinal axis 17 in the body from a setting position to a release position in response to a sufficient differential hydraulic pressure force acting on its ends. The position as shown in FIG. 1 is the setting position. The piston is retained in the setting position of FIG. 1 by a plurality of shear pins 22. These shear pins extend into the piston and are retained in a ring 24. Ring 24 abuts an interior shoulder 26 of body 18. An annular, blocking and actuation land 28 normally engages and supports the interior ends of dogs 15, retaining the dogs in an extended position. In addition, a pin 11 connects one end of rocker arm 16 to one of the dogs 15. The other (unpinned) end of rocker arm 16 is shown near annular piston relief 29. Annular reliefs 27 and 29 on the upper and downward sides of the land 28 have a reduced diameter with respect to the dog supporting land 28. (In this specification, words of direction are with reference to the work string and well hole.)

Piston 20 has an upper annular face 30 normal to axis 17 of the assembly. Upper face 30 is in communication with and acted upon by hydraulic pressure of the contacting fluid in the work string. This pressure applies a downward force on the piston (to the right as shown in FIG. 1).

The piston also has a bottom annular face 32 which sees essentially the same hydraulic pressure in the work string (except for flow losses from one end of the piston passageway to the other). This pressure applies an upward force on the bottom face of piston 20 that tends to force the piston to the left as shown in FIG. 1. The area of upper face 30 is larger than the area of bottom face 32 so that the net force on the piston from a hydraulic pressure in the string (assuming upper face and bottom face pressures are equal) is downhole. When the string pressure corresponds to a net downhole force sufficient to shear the shear pins, the piston is free to move. (This pressure correlates with the force required to shear and is sometimes referred to in the specification as the "predetermined pressure.")

A conical seat 33 at the upper end of the axial bore or fluid passageway through the piston 20 provides a seal for the pump down dart of FIG. 4, if one is necessary. If needed, the dart's plug blocks fluid flow and increases net downward force from a given fluid pressure, i.e., the dart reduces the predetermined pressure needed to shear the pins and shift the piston, releasing the assembly. When the piston shifts down to its release position, bleeder slots 35 in the piston can communicate fluid pressure to the liner through the windows that receive the dogs.

Running head 14 has four sockets 34. These sockets receive extended dogs 15 to attach the shear out setting assembly to the running head. Chamfer 19 of the dogs permits axial engagement of the dogs by the running head to help force the dogs to retract if the rocker arm 16 forces are not sufficient. Alternatively, other chamfers on other faces of the dogs can also apply retraction forces when rotational or translational forces are applied to these faces.

A top sub 36 of shear out setting assembly 12 connects to body 18 through threads 38 between the two. Sub 36 has an internal thread 40 for connection to drill pipe.

Running head 14 has a standard bottom sub 42 and a release sub 44. The release sub has sockets 34. Release sub 44 may couple to bottom sub 42 through a threaded connection 45. The other end of bottom sub 42 connects, typically, with a liner or liner assembly.

Before proceeding with the detailed description, the operation of the hydraulic release tool as adapted for use with liners will be briefly described.

With shear out setting assembly 12 and running head 14 attached together by dogs 15 engaged in sockets 34, the tool is rotated or turned by drill pipe (not shown) attached to a running head 14, which transfers the torque and turns a liner assembly (not shown). The liner assembly is run into a well hole while being turned. Accordingly, the running friction between the wall of the well hole and the liner will be lower than it would be if the liner were not rotating or translating (i.e., static friction). Because of the rotation, the problem that friction creates in high angle, extended reach well holes is substantially reduced.

When the liner has been run into the well hole and well cementing essentially completed, hydraulic pressure within the work string is increased sufficiently to fail shear pins 22, and the piston moves downward. When the piston moves downward, it first presents relief 27 to the base of dogs 15. The dogs, not being restrained by land 28, can respond to the radially inward force of rocker 16 when further movement of the piston forces a face of land 28 against unpinned end of rocker arm 10. The dogs move out of sockets 34 and out of engagement with the running head. If one or more of the dogs stick and rocker arm forces are insufficient to unstick the dogs, dog chamfer 19 engages the edge of sockets 34, and the dogs are further forced to retract because of the resulting radial inward force component of axial forces. Once the dogs are retracted, the shear out assembly is then free of the running head. The shear out setting assembly together with the drill pipe can then be pulled out of the hole.

Completing the detailed description of the invention shown in FIG. 1, body 18 has a lead downhole end 46. The head end has an external chamfer 48 at its head. A female pipe thread 50 opens out the lead end and provides coupling of the shear out setting assembly with another work string component. The body steps up from leading end 46 to section 52 at a shoulder 54. This section contains windows 56 that pass dogs 15 through the body. An external flange 58 extends radially outward from the exterior end of intermediate section 52. Although not required for all embodiments, this shoulder has a right angle leading face 60 and a conical trailing face 62; the latter keeps debris and other foreign matter from between the hydraulic release tool and the interior of the running head. The trailing face of the shoulder transcends into a trailing end 64 of the body. A pair of first seals (e.g., O-rings) 66 seal the interface between the body and release sub 44 of running head 14. Leading face 60 abuts the upper end of release sub 44 when the shear out assembly and running head are connected.

Piston 20 has an external flange 70 at its upper end. This flange mounts a second set of seals (e.g., O-rings) 72 that seal the piston and body bore wall so that internal hydraulic pressure does not pass the flange into an annular relief 74 behind the flange. The relief space between the relief 74 surface and the interior surface of the body can be vented to outside the body through port 76. This relief space also contains ring 24 and shear pins 22.

A shoulder 78 on an internal flange 80 at the bottom end of relief 29 provides a stop for the piston by engaging a facing end of land 28. O-rings 81 on the interior axial surface of flange 80 seal against a surface of the piston to keep work string fluid out of relief 29.

A rocker arm 16 is pinned to each dog 15 within body 18 and the rocker arm pivots around stop or hinge 82. Pivoting motion (clockwise around stop 82) occurs when the facing end of land 28 of downward moving piston 20 is forced against the unpinned end of rocker arm 16.

A plurality of set screws 86 complete the connection between top sub 36 and body 18. The set screws prevent unthreading of threaded connection 38. The threads of the threaded connection, however, take the axial load.

FIG. 2 shows the present invention showing FIG. 1 as an assembly 110. Assembly 110 includes the setting assembly 12 coupled to running head 14.

The preferred embodiment (in a 7 inch nominal diameter size) of top sub 36 of setting assembly 12 has a nominal outside diameter of 6.375 inches (167.1925 cm) and a nominal inside diameter of 3.0 inches (7.62 cm). Pipe threads 40 are 4½ inch nominal interference fit.

The internal diameter of piston 20 in the preferred embodiment is 2.625 inches (6.6675 cm). The downstream (towards the right) outside diameter of the piston 20 is smaller than the nominal 3.50 inch (8.89 cm) inside diameter of the drill pipe 112 attached to body 18 at threads 50 to allow translating motion of the piston 20.

The load-bearing dogs 115 are shown engaging recesses 34 in running head 14. As shown, piston 20 is in its setting or uppermost position, with dogs 15 radially extending outward and the unpinned ends of rocker arms 16 radially extending inward.

As fluid pressure from the surface (from the left) increases, the piston 20 tends to be urged towards the downhole (shown to the right) direction. The increasing fluid pressure acts on upper face surface 30 while seals 72 and 81 prevent the increasing internal fluid pressure from acting on most of the reverse acting faces of piston 20.

Downward motion of piston 20 moves a face of land 28 towards the radially inward projecting end of rocker arm 16. The facing end of land 28 urges the rocker 16 to rotate clockwise around stop 82 when contact occurs. The clockwise motion of pinned end of rocker arm 16 is transferred to radially inward motion of dog 15 through pin 11.

An alternative embodiment attaches and pivots rocker arm 16 around hinge 82. Hinge 82 may also be located in the interior portion of rocker arm 16 to improve structural integrity. Alternative dog 115 includes an interior bearing surface 83 (shown dotted for clarity) which transfers the clockwise motion of rocker arm 16 to inward motion of dog 115 when contact occurs. This interior bearing surface replaces pin 11 in the preferred embodiment.

With reference to FIG. 3, a typical application of the embodiment of the invention shown in FIG. 1 is illustrated. In FIG. 3, a string of drill pipe 180 connects directly to the hydraulic release tool 10. With reference to FIG. 1, that connection would be through an external thread on the end of the drill pipe and internal thread 40. The hydraulic release tool, in turn, connects serially to other components in the work string. The components shown are a running head 182, a safety joint 184, a liner hanger 186, liner 188, a landing collar 190, a float collar 192, and a float shoe 194. In the preferred embodiment, the safety joint is the oil tool safety joint as described in copending application Ser. No. 07/589,321, filed Sep. 27, 1990 and incorporated herein by reference. Depending on the application, the safety joint and liner hanger can be eliminated. A top drive or power swivel 196 rotates the work string. A rotating cement head 198 enables cement slurry to enter the drill pipe string and flow downward.

FIG. 4 shows a pump down wiper dart or flow restrictor used in the event that the hydraulic release tool does not function because of an inability to increase work string pressure sufficiently to shear the shear pins. A wiper dart 202 has a head 204 and a plurality of conical rubber wipers 206 after the head. The wipers align the dart in the working string. A ball 208 spaced from the balance of the wiper by an axial shaft 209 can seal against seat 33 (or a restriction causing a fluid flow pressure differential across the seat 33) of the setting assembly shown in FIG. 1.

An alternative application of the release tool will now be described with reference to FIGS. 1 and 3. This alternative application is especially useful for running and cementing a liner in an extended reach well. Liner 188 is run into a well hole while rotating drill pipe 180 through top drive or power swivel 196. Rotation of the drill pipe rotates the hydraulic release tool. Because the hydraulic release tool couples to the liner, the liner also rotates. The string moves downhole as it rotates. Rotation reduces the friction that would otherwise exist between the liner and the well hole wall in a high angle, extended reach well. After the liner is properly located in the drill hole, it is time to cement. The liner continues to rotate and/or reciprocate during initial cementing operations under the power of top drive or power swivel to evenly distribute the cement slurry in the well hole/liner annulus.

The cement slurry passes into the interior of the drill pipe string and into the liner to fill them. Then a drill pipe wiper dart is released into the drill pipe. A fluid under pressure behind the drill pipe wiper dart forces the dart through the drill pipe string, wiping the cement slurry from the interior of the drill pipe. When the drill pipe wiper dart reaches the bottom of the drill pipe string and the top of the liner, it latches into a larger diameter wiper plug, and the combination of the two plugs is pumped through the liner to wipe and displace the cement slurry from its interior wall. The liner wiper plug finally bumps into the landing collar and stops.

When the liner wiper plug (and wiper dart) bumps into the landing collar, pressure in the work string is increased, say to 2,000 psi, to actuate liner hanger 186, which engages the top of the liner with the inside of the previously run casing so that the weight of the liner is taken by the wall where the hanger engages it. Pressure in the work string is then increased, say to 3,200 psi, to shear the shear out setting assembly from the running head. The drill pipe and released shear out setting assembly are then pulled from the hole.

In the event that the wiper plug does not land on the landing collar so that work string pressure increases, pump down dart 202 inserted strategically in the work string during the prior mentioned liner displacement to release the setting assembly from the coupling member. In use and with reference to FIGS. 1 and 4, dart 202 is pumped down the work string. Head 204 and rubber wipers 206 pass through the bore of the piston, and ball plug 208 lands on seat 33, sealing the work string downstream of the seat. With the seal, hydraulic pressure upstream of the ball is not opposed by pressure downstream of the ball on face 32. Further, the area of the piston bore through the ball sees work string pressure, increasing the shearing force on the shear pins. Accordingly, the shear pins shear at a lower pressure, and the piston moves to cause the retraction of the dogs.

With ball 208 on seat 33, back pressure valves in float collar 192 and float shoe 194 force the ball into a tighter seal on the seat when an attempt is made to pull the setting assembly from the running head. At this time, bleeder slots 35 are radially inset of seals 81 because the piston is in its shifted position. Accordingly, the pressure downhole can bleed down through the bleeder slots 35 across the interface between land 28 and the adjacent wall of the body and out windows 56.

The drill string release tool operates much in the same manner as the liner string release tool just described, but it serves a different purpose. The drill string release tool provides a convenient way to separate the drill string in the event that its leading end gets stuck in the well so that the leading end can be removed by standard techniques. The drill string release tool is merely inserted in series in the drill string at a desired point. If the leading end gets stuck, the shear out setting assembly of the drill string release tool is sheared from the release sub, and the drill string and the shear out setting assembly removed so that the stuck portion of the drill string can be retrieved.

Alternative embodiments can include: deleting the dog supporting land 28 and actuating the dogs and rocker arm by other means (depending only on the rocker arm to retain dogs in the extended position); and combining the hydraulic release tool in a string with an upstream or downstream inflatable packer to seal the string portion and attached components.

While the preferred embodiment of the invention has been shown and described, and some alternative embodiments also shown and/or described, changes and modifications may be made thereto without departing from the invention. Accordingly, it is intended to embrace within the invention all such changes, modifications and alternative embodiments as fall within the spirit and scope of the appended claims.

What is claimed is:

1. A release tool for separating a first portion of an underground fluid conduit from a second portion of a fluid conduit, said tool comprising:
   (a) a coupling member attachable to said first portion and having a coupling surface; and
   (b) a setting assembly attachable to said second portion, said setting assembly comprising:
      (i) a body substantially radially disposed around a longitudinal axis, said body having a bore substantially along the axis;
      (ii) detachable means for attaching the body to the coupling surface, said detachable means moveable from an attach position to a detach position and capable of transmitting a rotational torque from said coupling to said body when in said attach position; and
      (iii) releasable means for moving said detachable means and blocking movement of said detachable means from said attach position to said detach position when said blocking means is in a retention position within said bore and in the absence of a predetermined fluid pressure, said releasable means having a fluid passage substantially along said axis for conducting a fluid from said first to said second conduit portions, and wherein said releasable means is capable of actuating to a release position by said predetermined pressure, said actuating both unblocking and moving said attaching means to said detach position.

2. The release tool of claim 1 which also comprises a second setting assembly attached to said first portion and capable of separating most of said first conduit portion from said second conduit portion in the absence of said predetermined fluid pressure.

3. The release tool of claim 2 herein said releasable means comprises a plurality of radially outward extendable dogs.

4. The release tool of claim 3 wherein said releasable means comprises a hollow piston slidable within said bore and having a radially outward facing surface blocking radially inward motion of said dogs when said piston is in said retention position.

5. The release tool of claim 4 wherein said releasable means also comprises a rocker arm for urging said dogs radially inward when said piston is slid towards its release position and said rocker arm is contacted by said land.

6. The release tool of claim 5 wherein said radially inward motion of said dogs occurs in the absence of a force from a spring.

7. The release tool of claim 6 wherein said rocker arm is rotatable within said body.

8. The release tool of claim 7 wherein said rocker arm is pin connected to one of said dogs.

9. The release tool of claim 8 wherein said coupling surface mates with a facing surface of one of said dogs when in said attach position and wherein said coupling surface and facing surface are shaped and dimensioned to convert a portion of an axial force into a force urging the dog towards said detach position.

10. The release tool of claim 9 wherein said facing surface is chamfered.

11. The release tool of claim 10 wherein said coupling surface and a facing surface of one of said dogs when in said attach position and wherein said coupling surface and facing surface are shaped and dimensioned to convert a portion of a torque into a force urging the dog towards said detach position.

12. A release tool for separating a first portion of an underground fluid conduit from a second portion of a fluid conduit, said tool comprising:
    (a) a coupling member attached to said first portion and having a coupling socket; and
    (b) a setting assembly including:
       (i) a body substantially attached to said second portion, said body having a bore substantially along a longitudinal axis;
       (ii) detachable means for attaching the body to the coupling socket, said detachable means moveable from an attach position to a detach position; and
       (iii) releasable means for releasing said detachable means when exposed to a predetermined fluid pressure, said releasable means having a fluid passage substantially along said axis for conducting substantial amounts of a fluid from said first to said second conduit portions.

13. A release tool for separating a first portion of an underground fluid conduit from a second portion of a fluid conduit, said tool comprising:
    (a) a coupling member attached to said first portion and having a coupling socket;
    (b) a setting assembly including:
       (i) a body substantially attached to said second portion, said body having a bore substantially along a longitudinal axis;
       (ii) detachable means for attaching the body to the coupling socket; said detachable means moveable from an attach position to a detach position; and
       (iii) releasable means for releasing said detachable means when exposed to a predetermined fluid pressure differential, said releasable means having a fluid passage substantially along said axis and capable of conducting a substantial amount of a fluid from said first to said second conduit portions.

14. The release tool of claim 13 which also comprises a fluid restrictor capable of generating said fluid pressure differential when said restrictor is placed in said fluid passageway and pressurized fluid is supplied upstream.

15. The release tool of claim 14 wherein said fluid restrictor comprises a wiper dart having a ball plug shaped to seal said fluid passageway.

16. The release tool of claim 15 wherein said fluid passageway also comprises a seat shaped so that said ball plug is retained in said seat when said dart is inserted upstream of said tool.

* * * * *